United States Patent [19]

Shaw

[11] Patent Number: 4,848,889
[45] Date of Patent: Jul. 18, 1989

[54] ARTCLE OF ADORNMENT

[75] Inventor: Gordon K. Shaw, Transvaal Province, South Africa

[73] Assignee: Satex Oil Corporation (Pty) Ltd., Cape Province, South Africa

[21] Appl. No.: 927,307

[22] Filed: Nov. 5, 1986

Related U.S. Application Data

[63] Continuation-in-part of Ser. No. 740,723, Jun. 3, 1985.

[51] Int. Cl.⁴ ............................................. G02C 11/02
[52] U.S. Cl. ......................................... 351/51; 351/52
[58] Field of Search ........................... 351/51, 52, 158

[56] References Cited

FOREIGN PATENT DOCUMENTS 8403154  8/1984  Fed. Rep. of Germany ........ 351/51
466034   5/1937  United Kingdom .................. 351/51

Primary Examiner—Rodney B. Bovernick
Assistant Examiner—P. M. Dzierzynski
Attorney, Agent, or Firm—Silverman, Cass, Singer & Winburn, Ltd.

[57] ABSTRACT

A pair of frames for eyeglasses is made from transparent plastics material and includes an elongated passage therein. An elongated, flexible colored member having sides of different colors is located in the passage in one of several axially rotational positions and is held in this position to prevent accidental rotation.

7 Claims, 1 Drawing Sheet

ARTCLE OF ADORNMENT

INTRODUCTION TO THE INVENTION

This invention relates to frames for eyeglasses of the type worn by humans.

The patent application in support of which this specification is lodged is a continuation in part application based on United States patent application Ser. No. 740,723 filed on the 3rd of June 1985.

BACKGROUND OF THE INVENTION

In the specification to Cundy's British Pat. no. 466 034 eyeglass frames the colour of which may be changed, are described.

One of the exemplary ways of doing this is to provide a hollow passage in the frames into which a coloured filament may be inserted.

SUMMARY OF THE INVENTION

In this specification the term "colour" or "coloured" includes white and black, the term "transparent" includes "translucent", and the term "polygon" means a plane figure having more than three sides.

According to the invention a pair of eyeglass frames includes at least one transparent section having a a hollow passage therein, with the hollow passage communicating with the exterior of the frames via an orifice for the insertion into the passage of a coloured member; the passage and the coloured member being elongated and the frames including means for holding the coloured member in one of at least two rotational positions in the passage.

Further according to the invention the means for holding the coloured member in one of at least two axially rotational postions are corresponding non-circular cross sectional configurations for the passage and coloured member.

Still further according to the invention the coloured member is a flexible coloured member and has different colours or patterns or both on at least two of the sides thereof.

Still further according to the invention the cross sectional configuration is substantially oval or substantially polygonal, and preferably substantially triangular, rectangular, pentagonal or hexagonal.

Still further according to the invention the upper portions of the frame adjacent the lens aperatures constitute transparent sections as defined.

Still further according to the invention the eyeglass frames include light diffusion formations on the front exterior of the transparent sections.

The invention also provides a pair of eyeglass frames as defined excluding a coloured member as defined. The invention also proves a coloured member as defined.

The invention also provides a pair of eyeglasses having frames as defined.

BRIEF DESCRIPTION OF THE DRAWINGS

Several embodiments of the invetion, described by way of example only, follow with reference to the accompanying drawings in which.

DETAILED DESCRIPTION OF THE DRAWINGS

Figure 1:
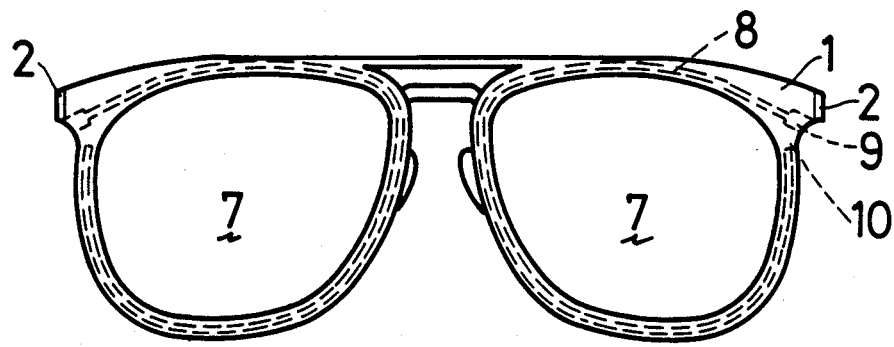
FIG. 1 is a front elevation of a pair of eyeglass frames according to the invention.
Figure 2:
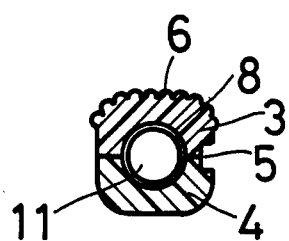
FIGS. 2 to 7 are cross sectional elevations through passages and coloured members of different configurations for the eyeglass frames.
Figure 3:
Figure 4:
Figure 5:
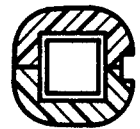
Figure 6:
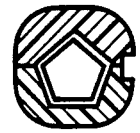
Figure 7:
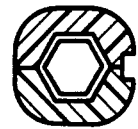
Figure 8:
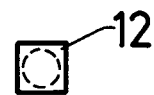
FIG. 8 is an end elevation of a coloured member for use with the configuration shown in FIG. 2.

In the first embodiment of the invention, as shown by FIGS. 1, 2 and 8 of the accompanying drawings, a pair of eyeglass frames 1 is made from transparent plastics material and has the normal ear engaging members 2 hingedly attached to the sides thereof.

Eyeglass frames 1 are made from a front half 3 and a rear half 4 which are ultrasonically welded together and which in the region for accomodating the lenses include an internal retaining channel 5.

The front half 3 of the eyeglass frames 1 include light diffusion formations in the form integral convex ribs 6 on the front thereof.

Centrally located within the frame 1 and surrounding each of the lens appertures 7 is a substantially circular passage 8. Each of these passages commences at a position just below the hinge passes around the lens and terminates in a position 10 adjacent the inlet of orifice 9. Although the passage is circular in cross sectioned as mentioned above the cross sectional configuration of the inlet orifice is square with its length approximately equal to the diameter of the passage.

A flexible coloured member 11 is provided for insertion into each of the passages 8 and comprises a length of flexible plastics material of circular cross section . Each half of the length of the coloured member is a different colour so that if the coloured member 11 is inserted in one position the first colour will be visible through the front of the transparent frame 1 and if the member is rotated through 180 degrees the other colour will be visible. Obviously if the member is rotated through only 90 degrees both colours will be visible. The coloured member 11 is prevented from rotating accidently by a square shaped location member 12 which fits into the square sectioned orifice and which must be withdrawn before the coloured member can be rotated. In this way the apparent colour of the frames may be changed between two coloures relatively easily.

It will readily be appreciated that the passages 8 and coloured members 11 need not be of circular configuration, but may be of a variety of configurations some of which are illustrated in FIGS. 3 to 7. Thus in FIG. 3 the configuration of both passage and coloured member is oval, in FIG. 4 they are triangular, in FIG. 5 they are square, in FIG. 6 they are pentagonal, and in FIG. 7 they are hexagonal.

In each of these cases various surfaces of the coloured member may be coloured differently and may include patterns in order to give a different visual effect when the coloured member is rotated.

Because of the cross sectional configurations of the passages and members it will obviously not be necessary to provide a locating formation at the ends of the coloured members to prevent them from turning accidently.

Other embodiments are envisaged with in the scope of the invention including other shapes and configurations not only of the passages and coloured members but of the eyeglass frames themselves.

What is claimed is:

1. A transparent spectacle frame including a front half (3) and a complementary rear half (4) secured together and configured to define in said frame a pair of lens retaining recesses and a pair of hollow passages, said passages being outwardly displaced from said recesses and substantially encircling each of said recesses and said lenses, said passages comprising a pair of substantially hollow blind passages each closed at one end and open to a separate point on the surface of said spectacle frames on the other end, each of said passages including a predetermined cross-sectional configuration throughout its length and configured to receive a visible decorative insert of elongate configuration disposed therewithin of sufficient length to extend substantially the full length of said passage around each of said lenses and further configured to cooperate with said defined internal configuration of said passage to orient and maintain said orientation of said insert within said passage and expose predetermined portions of said insert to view throughout its lens encircling extent, and retention means associated with said passage opening on said spectacle frame to retain said decorative insert in said predetermined relationship in said passage.

2. Eyeglass frames as claimed in claim 1 in which the cross sectional configuration is substantially oval and the decorative insert is a flexible coloured member.

3. Eyeglass frames as claimed in claim 1 in which the cross sectional configuration is substantially polygonal.

4. Eyeglass frames as claimed in claim 3 in which the cross sectional configuration is one of substantially triangular, rectangular, pentagonal and hexagonal.

5. Eyeglass frames as claimed in claim 1 in which the decorative insert has different colours or patterns or both on at least two of the sides thereof.

6. Eyeglass frames as claimed in claim 1 wherein said passage is of non circular cross section along the length thereof and said decorative insert non circular mating cross section also is formed along the length thereof.

7. A decorative insert as defined by claim 1 for insertion into a hollow passage having at least a portion with a non circular cross section in a pair of eyeglass frames, said insert comprising an elongated flexible member having at least a portion thereof having a mating non circular portion adapted to be inserted into the passage to prevent rotation of said member in said passage.

* * * * *